US006993841B2

(12) United States Patent  (10) Patent No.: US 6,993,841 B2
Grotti  (45) Date of Patent: Feb. 7, 2006

(54) PROCESS FOR THE PRODUCTION OF FILLED WIRE AND PLATE STRIP TO CREATE BI-COLOR ORNAMENTAL ITEMS AS WELL AS SIMILARLY MADE ITEMS

(75) Inventor: Rodolfo Grotti, Arezzo (IT)

(73) Assignee: Orocinque S.p.A., Arezzo (IT)

( * ) Notice: Subject to any disclaimer, the term of this patent is extended or adjusted under 35 U.S.C. 154(b) by 242 days.

(21) Appl. No.: 10/336,724

(22) Filed: Jan. 6, 2003

(65) Prior Publication Data
US 2003/0234273 A1 Dec. 25, 2003

(30) Foreign Application Priority Data
Jun. 25, 2002 (IT) .......................... AR2002A0023

(51) Int. Cl.
B23K 31/02 (2006.01)
(52) U.S. Cl. .............................. 29/896.411; 29/896.41; 29/896.43; 63/1.16; 63/4; 59/35.1; 59/80; 228/145; 228/245
(58) Field of Classification Search ............ 29/896.43, 29/33 D, 896.41, 896.411; 63/1.16, 4; 59/35.1, 59/80; 428/615, 577; 228/131–133, 245–246, 228/56.3, 256
See application file for complete search history.

(56) References Cited

U.S. PATENT DOCUMENTS

| 921,722 | A | * | 5/1909 | Meyer | 29/896.43 |
| 978,846 | A | * | 12/1910 | Carlisle | 228/132 |
| 2,088,446 | A | * | 7/1937 | Specht | 228/130 |
| 4,114,398 | A | * | 9/1978 | Orlandini | 63/3 |
| 4,297,416 | A | * | 10/1981 | Krug et al. | 428/576 |
| 4,986,067 | A | * | 1/1991 | Caccialupi | 59/3 |
| 5,425,228 | A | * | 6/1995 | Hillel | 59/80 |
| 5,797,258 | A | * | 8/1998 | Strobel et al. | 59/35.1 |
| 6,092,358 | A | * | 7/2000 | Grosz | 59/35.1 |
| 6,381,942 | B1 | * | 5/2002 | Grosz | 59/35.1 |
| 6,513,316 | B1 | * | 2/2003 | Passaro | 59/35.1 |
| 6,745,554 | B2 | * | 6/2004 | Dal Monte | 59/35.1 |
| 2003/0074918 | A1 | * | 4/2003 | Disegna | 63/4 |

FOREIGN PATENT DOCUMENTS

| GB | 2042943 | * | 10/1980 |
| GB | 2099285 | * | 12/1982 |
| JP | 03-180241 | * | 8/1991 |

* cited by examiner

Primary Examiner—Eric Compton
(74) Attorney, Agent, or Firm—Young & Thompson

(57) ABSTRACT

A ribbon of color A metal is combined with a thin layer of soldering alloy, bent and soldered to form a tube, it is then filled with a core of color B metal. The compound is then drawn and/or laminated until it is transformed into a long ribbon or into a wire, externally of color A and internally of color B. The filled ribbon or wire is wrapped like a solenoid around a deformable support, like a metal mesh and stamped into the desired shape. The resulting two faced element is then ground in order to remove, all along a strip and following a line or in dots, the superficial part of color A until the core of color B is revealed. The bi-colored long element is then treated like a single body and allows the realization of precious bi-colored ornamental items.

6 Claims, 3 Drawing Sheets

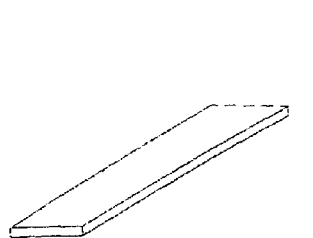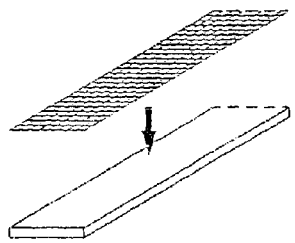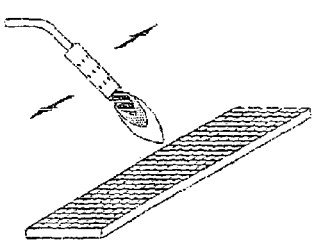
Fig. 1　　Fig. 2　　Fig. 3
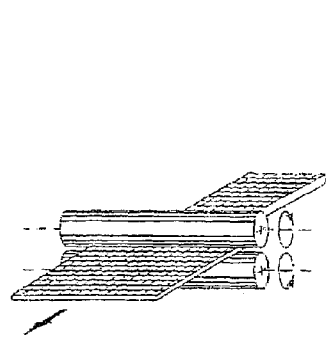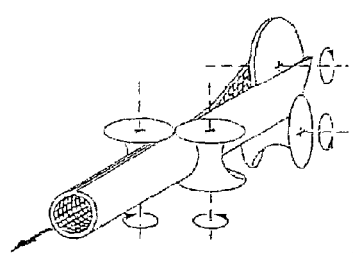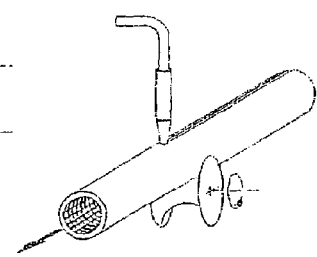
Fig. 4　　Fig. 5　　Fig. 6
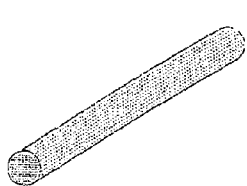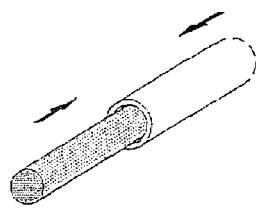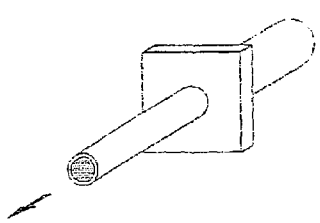
Fig. 7　　Fig. 8　　Fig. 9

PROCESS FOR THE PRODUCTION OF FILLED WIRE AND PLATE STRIP TO CREATE BI-COLOR ORNAMENTAL ITEMS AS WELL AS SIMILARLY MADE ITEMS

BACKGROUND OF THE INVENTION

Presently, there are on the market necklaces, bracelets, earrings and other ornamental objects created from a helicoidal spiral of a gold alloy, obtained through a manufacturing technology which originates a Model known by the operators of the gold industry as OMEGAS model (Italian Design No. 00072788 of Feb. 26, 1996 in the name of OROCINQUE S.p.A. of Arezzo).

In the OMEGAS model the helicoidal spiral is obtained from a "plate strip" or "ribbon" of gold alloy of adequate width and thickness, which is wrapped as a solenoid on a flat metal support which acts as a guide base to produce the spiral itself.

Through the resulting solenoid, deprived of its flat base, a weak support of precious metal is threaded, for example "milanaise mesh", "braiding", soft chain, or other supports capable to be deformed, so that the coupling is free, with the sliding support inside the spiral but without slack. Said composite structure undergoes a strong "stamping" process through which the anatomic shape and therefore the desired profile are obtained. The long element so realised is then transformed into necklaces, bracelets, earrings or other items, with the standard finishing operations. The objects produced through this process are made of yellow or white gold. In some cases, however, a bi-coloured product is required: yellow on one side and white on the other.

The two colours are now obtained starting only and exclusively from a plate strip or a wire of yellow gold alloy which are wrapped as a solenoid around the soft support, therefore, they are "stamped" to give them the required anatomic shape.

The stamping originates a two faced item; the faces can be both flat or one concave the other convex, or both convex. In order to give the product a bi-coloured aspect, one of the two sides undergoes a rhodium treatment through a galvanic bath, after the other side has been covered with a protective resin or paint that can be applied with a brush.

After the rhodium treatment, on the non-protected side, the protective paint or resin is removed with a solvent from the other side so the product has a yellow surface and a white rhodium plated one.

From the above description it is obvious that the "white" colour of one of the sides, which should be of white gold, is actually a simulation in that it is due to the rhodium treatment and not to the gold alloy.

When the ornament is worn, its use will wear out the very thin layer of rhodium and the yellow gold will reappear. The ornament in time will turn to a uniform yellow colour.

The so made ornaments have a lower value.

SUMMARY OF THE INVENTION

One of the aims of the present invention is to make high value ornamental items of bi-coloured precious metal, deriving from its composition with bi-coloured elements (for example with a wire or plate strip in yellow gold and in white gold).

Another aim of the present invention is that of manufacturing the bicolour ornamental items with a procedure that is not very different from the known one, so as to use the same machines and personnel used in manufacturing single colour items.

The invention that has permitted us to reach these aims is realised in the procedure defined by claim No. 1, in which in the manufacture of the items a bi-coloured wire or plate strip, that is made on the one side of yellow gold and on the other of white gold, are effectively used. This allows the production of items that maintain their many coloured aspect over time and are therefore of high value.

BRIEF DESCRIPTION OF THE DRAWINGS

The procedure that is the object of this invention is described in detail herebelow, with reference to the exemplifying figures in the enclosed designs, in which:

FIGS. 1, 2, 3, 4, 5 and 6 illustrate the creation of a long element with a tubular structure whose internal surface is covered with a thin layer of soldering alloy;

FIG. 7, 8, 9 and 10 illustrate the creation of a filled long element, in which the external part is of colour A and the internal part is of colour B;

DESCRIPTION OF PREFERRED EMBODIMENT

Figure 10:
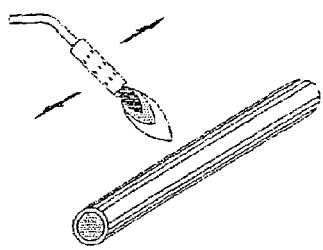

The invention, as indicated in claim 1, consists therefore of a procedure which foresees the production of a filled wire or plate strip, with which one can produce bi-colour ornamental items in precious metals, including:

a phase in which a thin layer of soldering alloy, or other equivalent soldering material, is applied by soldering to a plate strip of precious metal alloy of colour A;

a shaping phase in which the plate strip of colour A combined with the soldering alloy is transformed into a composite tube, with the part of soldering alloy positioned on the internal surface of said tube;

a phase in which a wire (core) of precious alloy of colour B, with a diameter that is slightly smaller than the internal diameter of the aforesaid composite tube, is inserted into said tube of colour A to create a composite structure;

a drawing phase with which the two coupled elements, the wire (core) of colour B and the composite tube of colour A, are made to adhere perfectly one to the other;

a soldering phase with which the soldering alloy, which separates the tubular structure made with the strip plate of colour A and the internal core made of precious alloy wire of colour B, is melted and with this soldering it causes their lasting connection, creating therefore a single filled body;

a lamination and/or drawing phase with which the single filled body is transformed into a long element with a filled plate strip or wire shape;

a phase in which said filled plate strip or wire are transformed into a solenoid winding on a soft support;

a modelling phase, through stamping, into the desired shape, of the helicoidal winding created with the single filled body; or a phase in which the filled wire or plate strip feed the machine which transforms them into a chain or other ornamental item, therefore shaped in the desired form;

a grinding phase, or other equivalent procedure, with which one of the faces of the shaped product is ground down with the removal of the metal or metal alloy of colour A till the internal core of colour B is brought to light;

a finishing phase with which the resulting bi-colour element is cut, furnished with connections, clasps or anything required to produce the desired finished item.

Figure 11:
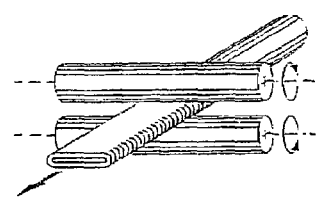
FIGS. 11 and 12 illustrate the transformation of the filled long element into a filled plate strip.
Figure 12:
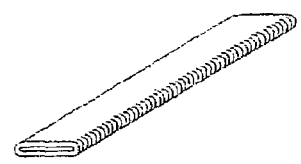
Figure 13:
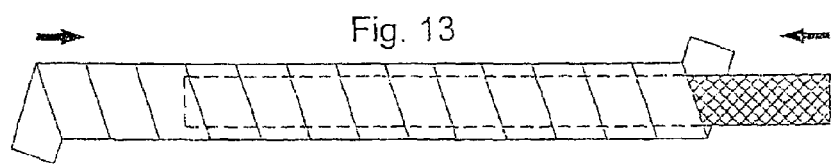
FIGS. 13 and 14 illustrate the spiral winding of the filled plate strip on a soft support and therefore its stamping.
Figure 14:
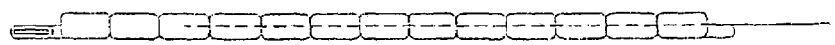
Figure 15:
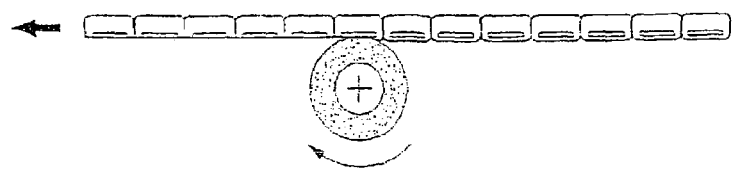
FIGS. 15 and 16 illustrate the operation by which one surface of the filled plate strip wound like a spiral is ground down to bring to light the internal filling with a different colour.
Figure 16:
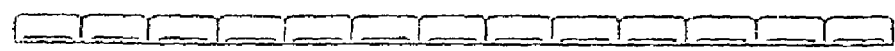
Figure 17:
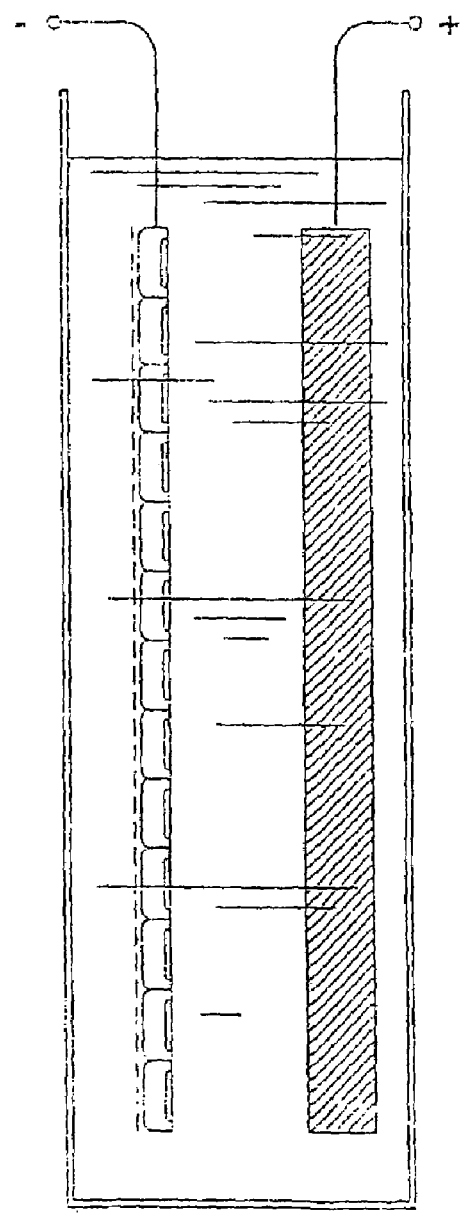
FIG. 17 illustrates the process by which the internal filling, brought to light, is rhodium treated.

The above specified production phases, in one preferred manufacturing solution, as also shown as an example in the drawings, consist in:

1. with yellow gold alloy (colour A) a plate strip of desired width and thickness is produced (FIG. 1);
2. a thin layer of soldering alloy is laid on one face of the plate strip (FIG. 2);
3. by means of an oven or a manual soldering torch, the soldering alloy is solidly fixed to the support plate strip (FIG. 3);
4. the obtained plate strip is laminated to reach the needed thickness and, at the same time, to increase the cohesion between the two parts which form it (FIG. 4);
5. the plate strip is inserted into a forming machine to be transformed into a tube, making sure that the layer of soldering alloy will form the inner face of the tube (FIG. 5);
6. the resulting tube is usually finished by joining the opposite edges of the plate strip by electric soldering (FIG. 6);
7. a wire in white gold alloy is prepared (colour B) (core), it is drawn until its diameter is slightly smaller than the internal diameter of the tube made as described above (FIG. 7);
8. the wire of white gold (core) is then inserted in said tube forming a filled tube (FIG. 8);
9. the filled tube is drawn and/or laminated so that, by reducing its external diameter, it is evidently compressed against the inner core, to recover entirely the dimensional tolerances and therefore to ensure that the external tube adheres perfectly to the inner core (FIG. 9);
10. the actual soldering of the elements (the external tube in yellow gold (colour A) and the inner core in white gold (colour B)) is then carried out to create a single long body, by passing the filled tube in an oven, or by an adequate heating of its external surface with a soldering torch (FIG. 10);
11. the single long body is then laminated to obtain a filled plate strip of needed width and thickness (FIG. 11);
12. the single long body is therefore transformed into a "ribbon" whose external surface is of yellow gold (colour A) and whose internal core is of white gold (colour B) (FIG. 12);
13. the ribbon is then wrapped like a solenoid around a soft support, for example a braiding, and is then "stamped" to give the product the desired shape (FIG. 13);
14. in this stage the external part of the semi-finished product is still in yellow gold (colour A) (FIG. 14);
15. one of the two sides, created through the stamping process is then passed through a grinding or a diamond cut process in order to remove the superficial layer of yellow gold (colour A) to show the internal core of white gold (colour B) (FIG. 15);
16. after the grinding process we finally have a bi-coloured element whose colours are evidently the result of the different gold alloys used (FIG. 16);
17. the ground side (FIG. 17) undergoes a rhodium treatment when the white gold requires to be "whitened" (it usually has a greyish tinge).

From all the above said, the product obtained with the new technology has the same appearance of the bi-coloured solenoid presently obtained with the rhodium treatment of the solenoid of a single colour, but its prerogative is that it is truly made of yellow gold (colour A) and white gold (colour B).

Apart from the production of bi-coloured solenoid wrappings, as described, this process can also be used to create other bi-coloured alloy products of different shapes, such as hammered chains and meshes.

In the production of items which do not have the solenoid shapes, the process of the present invention can be summarised as described herebelow:

The filled wire i.e. the single long body, (as obtained at the end of phase No. 10), or the bi-coloured filled ribbon (as obtained at the end of phase No. 12) are used to feed the machines that produce the wanted product (chain or mesh).

This is followed by the next step of modelling by hammering or stamping, through which the item is characterised by two or more faces.

One (or more) of said faces is ground or diamond cut, in order to remove the superficial part of yellow gold (colour A), until the internal white gold core emerges (colour B).

The removal of the superficial portion of yellow gold can also be carried out in part, through lines and dots, i.e. without involving the entire surfaces, to form designs and ornamental patterns.

After this, if the white gold needs to be whitened, the sides or the ground areas undergo a rhodium treatment.

A similar bi-coloured semi-finished product then undergoes the standard finishing steps through which it is transformed into finished ornamental objects ready to be placed on the market.

The items produced with this process are characterised by a surface or part of a surface of colour A, which is the external side of the strip plate or the wire forming the single body with a core with which the items are produced, and by a surface or part of a surface of colour B, which is the internal core of the single filled body, i.e. of the strip plate or wire with which the items are produced. The bi-coloured items created can also be characterised by the fact that the colour B surfaces, which belong to the exposed core, can be rhodium treated.

The semi-finished product and the obtained items, can be produced in any two colour combination by changing the colours A and B of the components.

What is claimed is:

1. A process for the production of a solenoid-shaped filled wire and filled plate strip to create bi-coloured ornamental items, which comprises:

firmly applying a thin layer of soldering alloy to a plate strip of colour A;

transforming the plate strip combined with the layer of soldering alloy into a compound tube having a soldering alloy portion placed on the inner surface of said compound tube;

inserting a wire of colour B, having a diameter slightly smaller than the diameter of the internal part of the compound tube, into said compound tube of colour A to obtain a filled tube;

thereafter drawing the filled tube;

soldering the filled tube in order to obtain a single filled body;

transforming the single filled body into a filled plate strip or into a filled wire by a lamination and/or drawing phase;

wrapping the filled plate strip or the filled wire in a solenoid wrapping over a soft support;

modeling the solenoid wrapping obtained with the single filled body into a desired shape by stamping; or modeling the solenoid-shaped filled wire or plate strip into a chain or into other ornamental items by feeding the solenoid-shaped filled wire or plate strip into a machine; and removing the colour A from one of the sides of the modeled product until a distinctive surface of the colour B internal core is brought to light.

2. The process according to claim 1, wherein the strip plate of colour A is a yellow coloured gold alloy, and the wire of colour B is a white coloured gold alloy.

3. The process according to claim 1, wherein the step of removing the colour A is carried out by a diamond cut process.

4. The process according to claim 1, wherein the step of removing one of the sides of the modeled product is carried out by grinding.

5. The process according to claim 1, wherein the step of removing is carried out only on part of the outer surface in order to create designs and ornamental patterns on the outer surface.

6. The process according to claim 1, further comprising subjecting the distinctive surface brought to light to a rhodium treatment.

* * * * *